United States Patent [19]

Weaver et al.

[11] Patent Number: 4,768,272

[45] Date of Patent: Sep. 6, 1988

[54] TANK ASSEMBLY ARRANGEMENT

[75] Inventors: Morris L. Weaver, Evans; Stephen F. Clements, Augusta, both of Ga.

[73] Assignee: Modern Welding Company, Inc., Owensboro, Ky.

[21] Appl. No.: 50,518

[22] Filed: May 18, 1987

[51] Int. Cl.[4] ............................................. B23K 37/04
[52] U.S. Cl. ................................................. 29/281.5
[58] Field of Search ................. 198/748; 269/43, 296, 269/289 MR, 58, 902, 61; 228/44.5, 49 B

[56] References Cited

U.S. PATENT DOCUMENTS

| 2,504,947 | 4/1950 | Grange | 269/296 |
| 3,827,126 | 8/1974 | Shiozawa et al. | 228/49.3 |
| 4,098,395 | 7/1978 | Olsson | 198/748 |
| 4,263,084 | 4/1981 | Takala | 269/43 |
| 4,356,615 | 11/1982 | Dearman | 228/49.3 |
| 4,504,047 | 3/1985 | Jantzen | 269/43 |

Primary Examiner—Robert C. Watson
Attorney, Agent, or Firm—Warren D. Flackbert

[57] ABSTRACT

An arrangement for assembling a metal storage tank which includes a framework having a stationary end frame portion and a carriage selectively movable toward and away from the end frame portion on rails disposed on the framework. Cylindrical tank sections, positioned on roller members mounted between the rails, are urged into a successive abutting arrangement by movement of the carriage toward the stationary end frame portion and, subsequently, rotated for on-site seam welding, i.e. one cylindrical tank section to another. The end frame portion and the carriage both include freely rotatable roller members disposed normally with respect to each other, in a vertical plane, to reduce drag upon cylindrical tank section rotation.

4 Claims, 2 Drawing Sheets

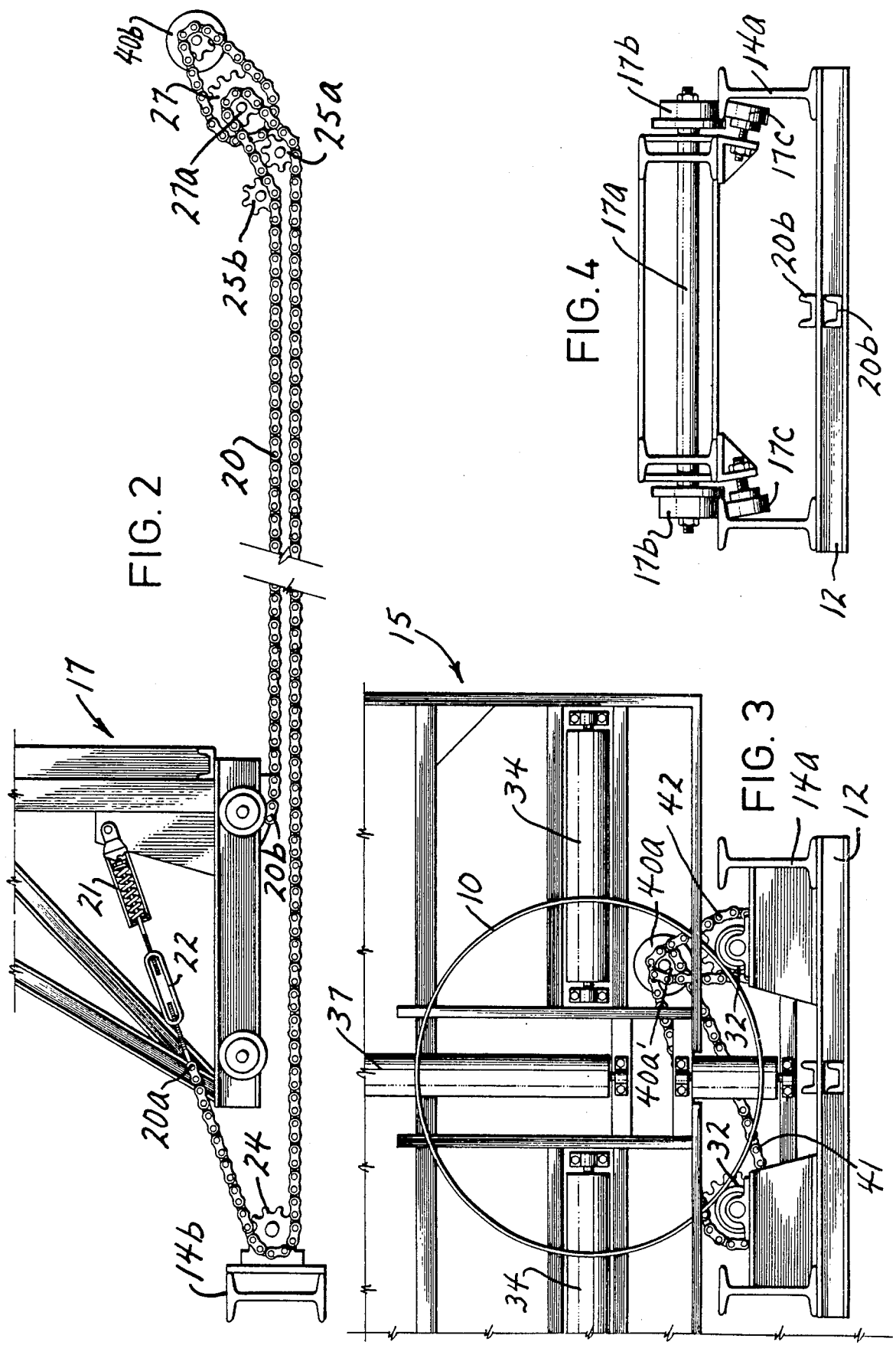

TANK ASSEMBLY ARRANGEMENT

As is known, the usage of metal tanks, for a variety of storage purposes, is widespread. The aforementioned tanks are presented and/or available in different sizes, both in length and diameter, depending upon the user's needs, where, typically, shells or cylindrical sections of tank defining a finished unit, when assembled, are secured together by welding techniques.

The invention presents a tank assembly arrangement where the individual cylindrical tank sections or shells are placed on rollers mounted on a framework which includes a stationary end and a movable carriage, the latter serving to urge and maintain the shells or tank sections into an abutting relationship, whereby such can be readily welded on-site. Provision is made for rotating the abutting cylindrical tank sections or shells during assembly. A chain drive serves to selectively draw or move the aforesaid carriage into a tank assembly condition, with such carriage being supported by wheels movable on rails.

In any event, a better understanding of the present invention will become more apparent from the following description, taken in conjunction with the accompanying drawings, wherein

DESCRIPTION OF THE FIGURES

FIG. 2 is a view in side elevation, with certain components omitted for reasons of clarity, illustrating the carriage and the drive arrangement for such;

FIG. 3 is a view in end elevation, looking toward the stationary frame end of the arrangement and detailing the tank rotating system; and, FIG. 4 is another view in elevation, in this instance, however, detailing certain portions of the carriage.

Figure 1:
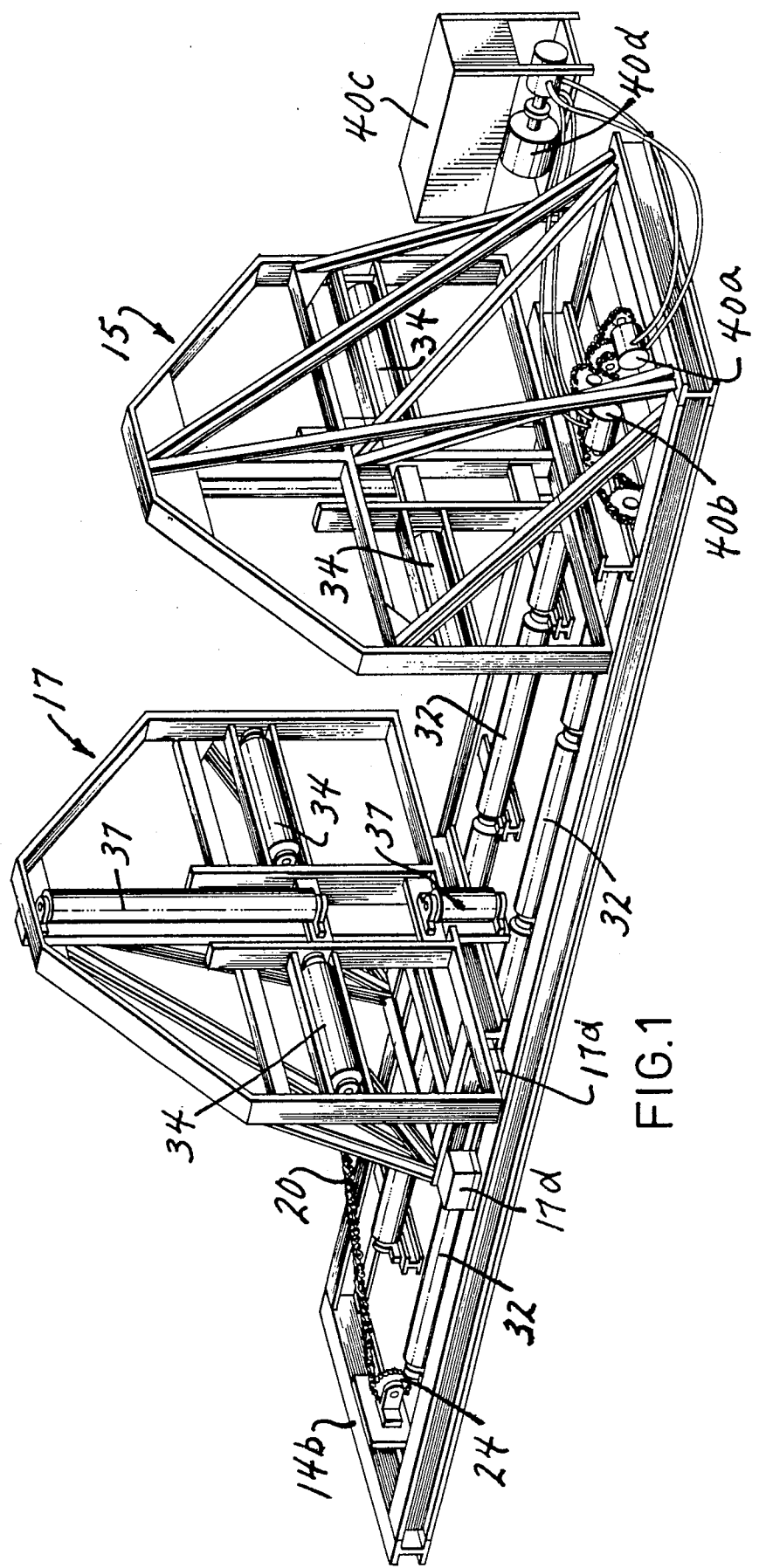
FIG. 1 is a perspective view of a tank assembly arrangement in accordance with the teachings of the present invention.

For the purposes of promoting an understanding of the principles of the invention, reference will now be made to the embodiment illustrated in the drawings and specific language will be used to describe the same. It will nevertheless be understood that no limitations of the scope of the invention is therey intended, such alterations and further modifications in the illustrated device, and such further applications of the principles of the invention as illustrated therein being contemplated as would normally occur to one skilled in the art to which the invention relates.

Referring now to the figures, the tank assembly arrangement of the invention is defined by a base framework 12 (evident only in FIGS. 3 and 4) represented by side rails and interconnecting end rails presenting an oblong configuration in top plan view. A carriage rail 14a extends along the top surface of each base framework side rail and end rails 14b interconnect the free ends of the carriage rail 14a, each being in the form of an I-beam. The arrangement further includes a stationary upstanding end frame 15 and a movable carriage 17.

Travel of the movable carriage 17 is achieved by the use of a chain 20 having one end 20a secured to the frame of the carriage 17 through a spring loaded shock absorber 21 and associated turnbuckle 22 and an opposite end 20b secured to another portion of the frame of the carriage 17. In order to achieve carriage 17 movement (and with particular reference to FIG. 2), chain 20 follows a path which includes passage around a fixed, but rotatable, end sprocket 24 bracket mounted onto an end rail 14b, along the length of the base, around an idler 25a, a drive sprocket 27a, and another idler 25b. A conventional hydraulic motor 40b chain drives a reducer sprocket 27 onto which the drive sprocket 27a is secured.

In other words, upon actuation of the hydraulic motor 32, the chain 20 is caused to move longitudinally, i.e. forwardly and rearwardly, along the base, causing the carriage 17 to travel toward or away from the stationary end frame 15. Thus, the carriage 17 serves to cause each cylindrical tank section or shell to move against the next adjacent tank section or shell and, finally, into a firmly engaging relationship with each other against the stationary end frame 15, whereupon welding can be achieved through conventional techniques.

In order to accomplish the latter, the instant arrangement includes a series of in-line rollers 32, on bracket mounted shafts, disposed within the carriage rails 14a and generally proximate and parallel with each (see FIGS. 1 and 3). Additionally, the movable carriage 17 and the stationary end frame 15 each also include bracket mounted rollers 34 and 37, respectively oriented both in a horizontal and in a vertical direction, i.e. normal with respect to each other. The rollers 32, 34 and 37 serve to achieve ready rotation of a tank 10 under processing (see FIG. 3), i.e. through the drive mechanism described herebelow serve tank rotation for ready seam welding of abutting shell or cylindrical sections.

FIG. 3 particularizes the tank or cylinder 10 rotating system which includes hydraulic motor 40a as a power source and chains 41 and 42 which extend from sprockets 40a' on the hydraulic motor 40a to sprockets at the end of the shafts carrying the rollers 32. Rollers 34 and 37 are freely rotatable, while the rollers 32 depend upon the hydraulic motor 40a for rotational displacement in the same direction through chains 41 and 42.

FIG. 4 serves to detail the relationship between the carriage 17 and the carriage rails 14a, where, as evident, axles 17a mount carriage wheels 17b at the ends thereof and support the carriage 17 for traveling. The wheels 17b ride on the carriage rails 14a and are retained in position during movement by roller type guides 17c. As evident in FIG. 1, the wheels 17b are typically contained within covers 17d.

The arrangement further includes chain guides 20a (in the form of receiving channels) on the base framework 12; a hydraulic fluid storage compartment 40c; and, a hydraulic pump 40d interconnecting hydraulic pumps 40a and 40b which respectively power the cylinder or tank rotating system (see FIG. 1) and the carriage advance system.

As should be evident from the preceding, tank assembly in accordance with the teachings of the present invention is readily accomplished through the provisions of the aforedescribed carriage advance system and the cylinder or tank rotating system. In normal operation, the shells or cylindrical tank sections are placed on the rollers 32, with the movable carriage 17 being spaced from the stationary end frame 15.

Upon operation of the carriage advance system, the movable carriage 17 moves in the direction of the stationary end frame 15, causing the longitudinal abutment of the successive shells or cylindrical tank sections so that the tank is assembled except for welding. With the actuation of the cylinder or tank rotating system, each of the juncture lines between abutting shells are welded by known techniques, where the shells are rotatable at any desired rate.

Importance lies in the fact that the rollers 34 and 37, being in a vertical plane and normal with respect to each other, permit ready rotational movement of the cylindrical sections, i.e. there is no undue drag by cylindrical tank section edge engagement with such.

Moreover, the chain guides 20a confine chain 20 movement when carriage 17 is traveling, either toward the stationary end frame 15 to assemble the adjacent shells or oppositely after a tank is assembled and/or when any shells are to be introduced on the arrangement for subsequent assembly. The instant arrangement serves to readily position cylindrical tank sections for assembly, being particularly significant in the instance of large diameter storage tanks.

The arrangement described hereabove is susceptible to various changes within the spirit of the invention, including, by way of example, in proportioning; the particular manner of moving or driving the carriage toward and away from the stationary end frame; the mechanism for rotating the assembled cylindrical sections for subsequent welding; the particular power source employed; and, the like. Thus, the preceding should be considered illustrative and not as limiting the scope of the following claims.

We claim:

1. A tank assembly arrangement comprising a framework including rail members, a stationary frame mounted at one end of the said framework, a carriage selectively movable on said rail members toward and away from said stationary frame, roller members mounted on said framework between said rail members and extending generally parallel therewith, said roller members receiving cylindrical tank sections in a cradling relationship, means rotating said roller members and said cylindrical tank sections, means powering said selective movement of said carriage and said cylindrical tank sections in an abutting relationship with respect to each other and against said stationary frame, and means securing together said cylindrical tank sections during rotation, where freely rotatable roller members are disposed in a vertical plane on said stationary frame and on said carriage, and where adjacent roller members are disposed at a right angled relationship with respect to each other.

2. The tank assembly arrangement of claim 1 where said carriage powering means is a chain.

3. The tank assembly arrangement of claim 1 where said roller members rotating means is a sprocket-chain.

4. The tank assembly arrangement of claim 1 where said roller members are horizontally and vertically disposed.

* * * * *